United States Patent [19]

Iida

[11] Patent Number: 4,966,011
[45] Date of Patent: Oct. 30, 1990

[54] AIR-CONDITIONING FOR AUTOMOBILES

[75] Inventor: Katsumi Iida, Konan, Japan

[73] Assignee: Diesel Kiki Co., Ltd., Tokyo, Japan

[21] Appl. No.: 446,286

[22] Filed: Dec. 5, 1989

[51] Int. Cl.⁵ .............................................. F25D 17/08
[52] U.S. Cl. ...................................... 62/179; 62/203; 62/244; 236/13; 236/49.3; 236/91 E; 236/91 F; 165/42
[58] Field of Search ................. 62/179, 180, 186, 239, 62/243, 244, 203, 208, 209; 236/91 R, 91 C, 91 D, 91 E, 91 F, 49.3, 13; 165/35, 36, 41, 42, 43, 16, 30, 40; 98/2.01

[56] References Cited

U.S. PATENT DOCUMENTS

| | | | |
|---|---|---|---|
| 4,289,272 | 9/1981 | Murase et al. | 236/91 D |
| 4,391,320 | 7/1983 | Inoue et al. | 62/244 X |
| 4,456,055 | 6/1984 | Yoshimi et al. | 62/244 X |
| 4,560,106 | 12/1985 | Dorsch | 236/91 E |
| 4,617,986 | 10/1986 | Kobayashi et al. | 236/91 C |

Primary Examiner—Harry B. Tanner
Attorney, Agent, or Firm—Wenderoth, Lind & Ponack

[57] ABSTRACT

In an air-conditioner for automobiles, cooled air having passed through an evaporator is immediately introduced through a cooled air bypass passage into the vehicle passenger compartment. The opening of a bypass door disposed in the bypass passage is adjusted based on a head part total signal corresponding to a thermal load in the vicinity of the head of an occupant which is obtained in view of the current discharge mode, or an auxiliary total signal corresponding to a thermal load in the vehicle passenger compartment which is obtained in view of the current discharge mode. With this arrangement, the occupant does never feel excess cold when the discharge mode is changed and hence a feeling of comfortableness toward the air-conditioning can be maintained.

6 Claims, 5 Drawing Sheets

AIR-CONDITIONING FOR AUTOMOBILES

BACKGROUND OF THE INVENTION

1. Field of the Invention:

The present invention relates generally to an air-conditioner for automobiles, and more particularly to an automobile air-conditioner incorporating a cooled air bypass unit for controlling the temperature of an upper part of the vehicle passenger compartment in the vicinity of the head of an occupant.

2. Description of the Prior Art:

There is widely known a variety of cooled air bypass units used for controlling the temperature of an upper part of the vehicle passenger compartment in the vicinity of the head of an occupant of the motor vehicle. According to one such known cooled air bypass unit exemplified in Japanese Utility Model Laid-open Publication No. 60-151710, the opening of a cooled air bypass door is controlled according to the solar radiation detected by a solar radiation sensor so as to improve the comfortableness of air-conditioning in the vicinity of the head of the occupant.

Since the known cooled air bypass door is actuated to open and close depending on the presence of the radiation of the sun, the occupant feels a sudden change of air-conditioning condition each time the motor vehicle goes from the shade into the sun and vice versa. There is accordingly a strong desire for an apparatus capable of providing a gentle change of air-conditioning condition.

According to one attempt proposed by the present assignee to improve the air-conditioning feeling, there is provided a multistage bi-level mode operation to vary the ratio of the amount of air discharged from a vent outlet and the amount of air discharged from a heat outlet for the purpose of changing the air-conditioning feeling smoothly. Such attempt however is not satisfactory because the temperature of air blown off into the passenger compartment drops gradually when the opening of the vent outlet is changed stepwise from the maximum to the minimum side during the multistage bi-level mode operation while the opening of an air-mix door and the opening of a bypass door are kept constant. Such a temperature drop does never occur theoretically but experiments indicate that it may be caused due to the structure of an air-conditioner unit.

Owing to this temperature drop of the discharged air, the air-conditioning feeling is considerably deteriorated.

SUMMARY OF THE INVENTION

With the foregoing difficulties in view, it is an object of the present invention to provide an automobile air-conditioner incorporating a cooled air bypass unit, which is capable of gently varying the air-conditioning feeling without causing a substantial temperature drop of the discharged air when the discharged mode is changed.

According to a first aspect of the present invention, there is provided an air-conditioner for an automobile, comprising: cooled air bypass means for introducing air into a passenger compartment of the automobile immediately after its passage around an evaporator, the cooled air bypass means being capable of adjusting the amount of air passing therethrough; total signal calculation means for calculating a total signal corresponding to a thermal load in the passenger compartment based on at least a vehicle passenger compartment temperature, a setting temperature and an outside air temperature; discharge mode setting means for setting a discharge mode by actuating a plurality of mode doors of a plurality of discharge outlets based on at least a temperature at the downstream side of the evaporator and an opening of an air-mix door controlled according to the result of calculation by the total signal calculation means; head part total signal calculation means for calculating a head part total signal corresponding to a thermal load in the vicinity of the head of an occupant based on at least the difference between a temperature in the vicinity of the head of the occupant and a head part setting temperature equivalent to a preset value for air-conditioning temperature in the vicinity of the head of the occupant, and the result of setting by the discharge mode setting means; and cooled air bypass control means for controlling the operation of the cooled air bypass means according to the result of calculation by the head part total signal calculation means so as to vary the amount of air passing through the cooled air bypass means.

With this arrangement, the amount of air passing through the cooled air bypass means is controlled by the head part total signal which is calculated by the head part total signal calculation means in view of the current discharge mode. Accordingly an excess supply of the cooled air into the passenger compartment can be avoided, as opposed to the prior art wherein the cooled air bypass control is performed regardless of the discharge mode.

According to a second aspect of the present invention, there is provided an air-conditioner for an automobile, comprising: cooled air bypass means for introducing air into a passenger compartment of the automobile immediately after its passage around an evaporator, the cooled air bypass means being capable of adjusting the amount of air passing therethrough; total signal calculation means for calculating a total signal corresponding to a thermal load in the passenger compartment based on at least a vehicle passenger compartment temperature, a setting temperature and an outside air temperature; discharge mode setting means for setting a discharge mode by actuating a plurality of mode doors of a plurality of discharge outlets based on at least a temperature at the downstream side of the evaporator and an opening of an air-mix door controlled according to the result of calculation by the total signal calculation means; auxiliary total signal calculation means for calculating an auxiliary total signal corresponding to the thermal load in the passenger compartment based on at least the vehicle passenger compartment temperature, the setting temperature, the quantity of solar radiation, and the result of setting by the discharge mode setting means; and cooled air bypass control means for controlling the operation of the cooled air bypass means according to the result of calculation by the auxiliary total signal calculation means so as to vary the amount of air passing through the cooled air bypass means.

With the automobile air-conditioner thus constructed, the cooled air bypass means is actuated to control the amount of air passing therethrough according to the auxiliary total signal which is calculated by the auxiliary total signal calculation means in view of the current discharge mode. Consequently, the cooled air is prevented from being blown off excessively into the passenger compartment.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described hereinbelow in greater detail with reference to first and second preferred embodiments shown in FIGS. 1 and 2, respectively, of the accompanying drawings.

Figure 1:
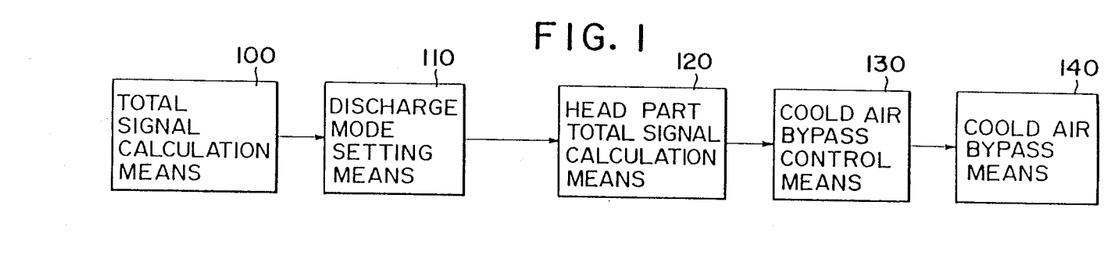
FIG. 1 is a functional block diagram of an automobile air-conditioner according to a first embodiment of the present invention.

As shown in FIG. 1, an air-conditioner for an automobile according to the first embodiment of the present invention generally includes: cooled air bypass means 140 for introducing air into a passenger compartment of the automobile immediately after its passage around an evaporator, the cooled air bypass means being capable of adjusting the amount of air passing therethrough; total signal calculation means 100 for calculating a total signal corresponding to a thermal load in the passenger compartment based on at least a vehicle passenger compartment temperature, a setting temperature and an outside air temperature; discharge mode setting means 110 for setting a discharge mode by actuating a plurality of mode doors of a plurality of discharge outlets based on at least a temperature at the downstream side of the evaporator and an opening of an air-mix door controlled according to the result of calculation by the total signal calculation means 100; head part total signal calculation means 120 for calculating a head part total signal corresponding to a thermal load in the vicinity of the head of an occupant based on at least the difference between a temperature in the vicinity of the head of the occupant and a head part setting temperature equivalent to a preset value for air-conditioning temperature in the vicinity of the head of the occupant, and the result of setting by the discharge mode setting means 110; and cooled air bypass control means 130 for controlling the operation of the cooled air bypass means 140 according to the result of calculation by the head part total signal calculation means 120 so as to vary the amount of air passing through the cooled air bypass means 140.

Figure 2:
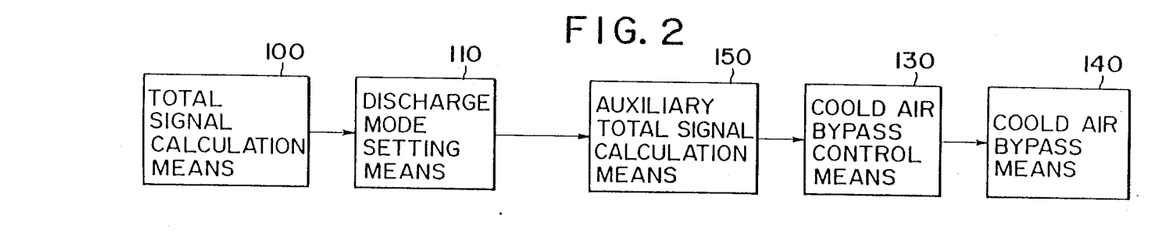
FIG. 2 is a functional block diagram of an automobile air-conditioner according to a second embodiment of the present invention.

Further, an air-conditioner for an automobile according to the second embodiment of the present invention includes, as shown in FIG. 2, cooled air bypass means 140 for introducing air into a passenger compartment of the automobile immediately after its passage around an evaporator, the cooled air bypass means being capable of adjusting the amount of air passing therethrough; total signal calculation means 100 for calculating a total signal corresponding to a thermal load in the passenger compartment based on at least a vehicle passenger compartment temperature, a setting temperature and an outside air temperature; discharge mode setting means 110 for setting a discharge mode by actuating a plurality of mode doors of a plurality of discharge outlets based on at least a temperature at the downstream side of the evaporator and an opening of an air-mix door controlled according to the result of calculation by the total signal calculation means 100; auxiliary total signal calculation means 150 for calculating an auxiliary total signal corresponding to the thermal load in the passenger compartment based on at least the vehicle passenger compartment temperature, the setting temperature, the quantity of solar radiation, and the result of setting by the discharge mode setting means 110; and cooled air bypass control means 130 for controlling the operation of the cooled air bypass means 140 according to the result of calculation by the auxiliary total signal calculation means 150 so as to vary the amount of air passing through the cooled air bypass means 140.

Figure 3:
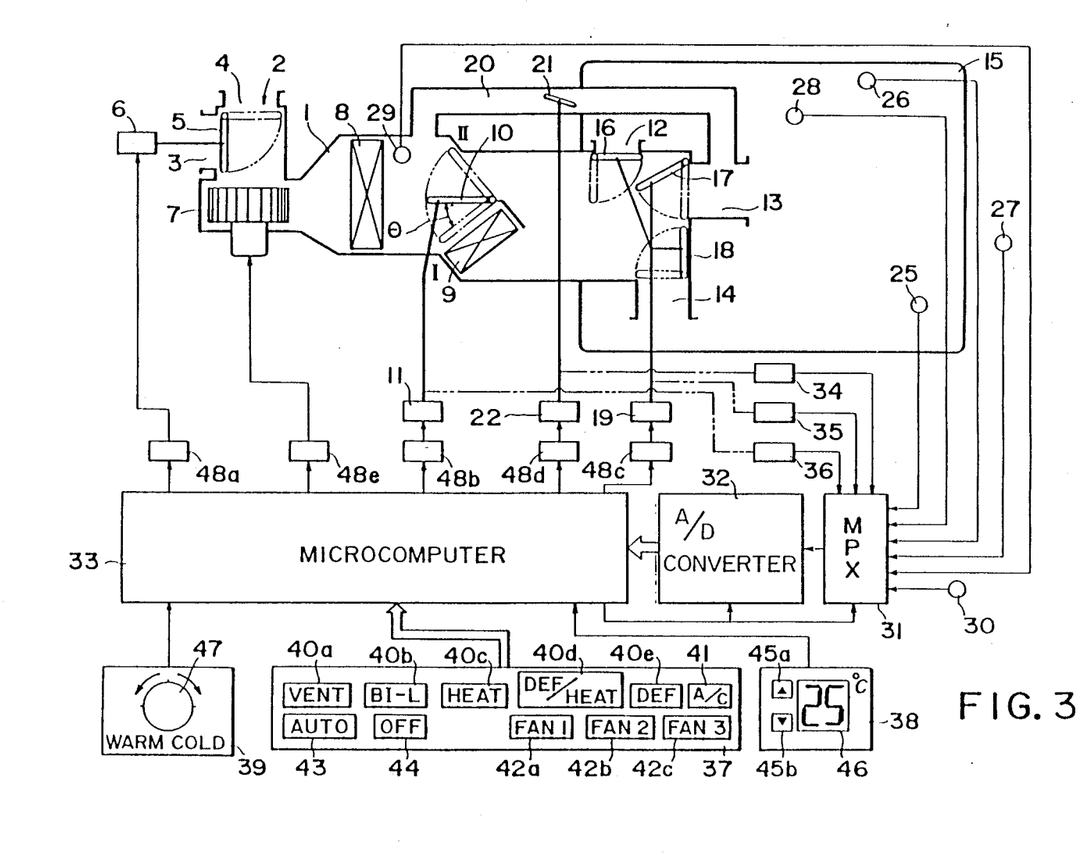
FIG. 3 is a diagrammatical view illustrative of the construction of an automobile air-conditioner according to the present invention.

As shown in FIG. 3, an automobile air-conditioner according to the present invention includes a main air-flow duct 1 having an intake door changeover device 2 disposed at the upstream end of the main air-flow duct 1. The intake door changeover device 2 includes a selecting door 5 disposed at the junction between a recirculated air inlet 3 and an outside air inlet 4 that are provided in bifurcated fashion. The selecting door 5 is actuated by an actuator 6 to select the outside air or the recirculated air to be introduced into the main air-flow duct 1.

A blower 7 is disposed in the duct 1 adjacent to the air inlets 3, 4 for forcing the air to flow downstream through the main air-flow duct 1. The duct 7 also includes an evaporator 8 disposed downstream of the blower 7.

The evaporator 8 is connected in fluid circuit with a compressor, a condenser and the like (neither shown) to jointly constitute a refrigeration cycle or system for cooling air passing around the evaporator 8. A heater core 9 is disposed in the main air-flow duct 1 downstream of the evaporator 8 so that air passing around the heater core 9 is heated through the heat exchange operation between the air and an engine cooling water circulating through the heater core 9.

An air-mix door 10 is disposed in front of the heater core 9 and pivotally movable by an actuator 11 so that the ratio of the amount of air flowing directly through the heater core 9 to the amount of air bypassing the hater core 9 is adjusted depending on the opening $\theta$ of the air-mix door 10. The air passed through the heater core 9 and the air bypassed the heater core 9 are then mixed up into temperature-conditioned air of a desired temperature.

The opening $\theta$ of the air-mix door 10 is 0% when the air-mix door 10 is located at the full cool position indicated by I in FIG. 3 and 100% when the air-mix door 10 is located at the full heat position indicated by II in the same figure.

The main air-flow duct 1 has at its downstream end a defroster outlet 12, a vent outlet 13 and a heat outlet 14 that are provided in branched fashion and all open to a vehicle compartment 15. Three mode doors 16, 17, 18 are disposed at the respective outlets 12, 13, 14 and adapted to be selectively opened and closed by an actuator 9 to set a desired discharge mode of the air-conditioner.

The air-conditioner further includes a bypass duct 20 for bypassing a length of the main air-flow duct 1. The bypass duct 20 has one end connected to the main air-flow duct 1 at a position between the evaporator 8 and the air-mix door 10, the opposite end of the bypass duct 20 being connected to the main air-flow duct 1 at a position in front of the vent outlet 13 so that a part of cooled air passing through the evaporator 8 is directly supplied to the vent outlet 13. The amount of cooled air supplied through the bypass duct 20 is adjusted by controlling the opening of a cooled air bypass door 21 by means of an actuator 22.

Denoted by 25 is a representative temperature sensor disposed on an instrument panel, for example, of the automobile for detecting a representative temperature $T_R$ in the passenger compartment 15. A head part temperature sensor 26 is disposed on the inside surface of the roof panel of the automobile for detecting a temperature $T_{Rh}$ in the vicinity of an occupant of the passenger compartment 15. Designated by 27 is a outside air temperature sensor for detecting an outside air temperature $T_A$ and 28 is a solar radiation sensor for detecting a solar radiation quantity $T_S$. A mode sensor 29 is disposed on or immediately downstream of the evaporator 8 for detecting a cooling capacity of the evaporator 8 in terms of a temperature of the evaporator 8 or a temperature of air passed through the evaporator 8. Reference numeral 30 denotes a cooling water temperature sensor for detecting a temperature of the engine cooling water. Output signals from the respective sensors 25-30 are selected by a multiplexer (MPX) 31, then converted by an A/D converter 32 into digital signals which in turn are inputted into a microcomputer 33.

The microcomputer 33 is also supplied with output signals from an instrument panel 37, a temperature setter 38 and an upper part temperature setter 39.

The instrument panel 37 is provided with mode switches 40a-40e for manually setting the discharge mode to the vent (VENT) mode, the bi-level (BI-L) mode, the heat (HEAT) mode, the defrost/heat (DEF/-HEAT) mode, and the defrost (DEF) mode, an A/C switch 41 for starting the aforesaid refrigeration cycle, fan switches 42a-42c for selecting the rotational speed of the blower 7 between a low speed (FAN1), an intermediate speed (FAN2) and a high speed (FAN3), an auto switch (AUTO) 43 for automatically controlling all the components of the air-conditioner, and an off switch (OFF) for stopping the operation of the air-conditioner.

The temperature setter 38 is composed of up and down switches 45a, 45b and an indicator or display 46 for indicating a setting temperature $T_D$. The setting temperature $T_D$ indicated on the display 46 can be varied within a predetermined range by properly actuating the up and down switches 45a, 45b.

The head part temperature setter 39 has a graduated disk or dial 47 adapted to be turned to vary the head part setting temperature $T_{Dh}$ within a predetermined range (COLD-WARM). The temperature setter 38 and the head part temperature setter 39 may be of the slide type having a slidable temperature regulating lever.

The microcomputer 33 is of the conventional type known per se and includes a central processing unit (CPU), a read only memory (ROM), a random access memory (RAM), an input/output port (I/O), etc. (none of them shown). The microcomputer 33 serves to calculate control signals based on the various input signals stated above and output the control signals to the actuators 6, 11, 19, 22 and a motor of the blower 7 respectively through driver circuits 48a-48g so as to control the operation of the respective doors 5, 10, 16, 17, 18, 21 and the rotation of the blower motor.

Figures 4A, 4B:
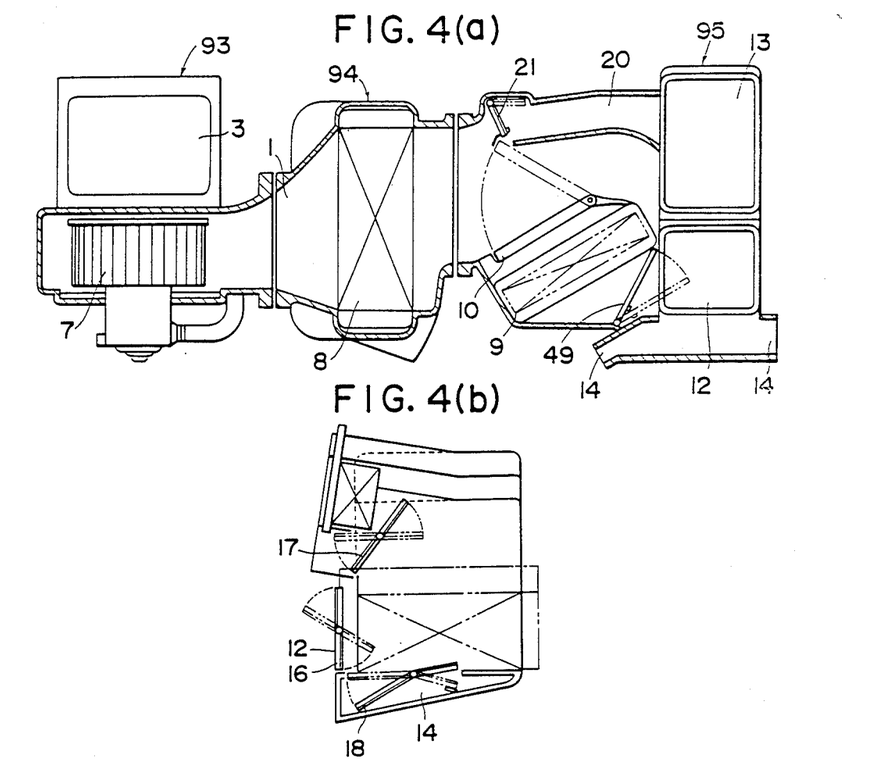
FIG. 4(a) is a longitudinal cross-sectional view of a casing of the air-conditioner.
FIG. 4(b) is a side elevational view of the casing.

FIG. 4(a) cross-sectionally shows the automobile air-conditioner of the invention and FIG. 4(b) illustrates a side view of the automobile air-conditioner.

The air-conditioner is generally composed of three units; a blower unit 93 in which the blower 7 is disposed, a first temperature controlling/air distributing unit 94 in which the evaporator 8 is disposed, and a second temperature controlling/air distributing unit 95 in which the heater core 9 and the air-mix door 10 are disposed.

In FIGS. 4(a) and 4(b), these parts which are identical to those shown in FIG. 3 are designated by the same reference characters and hence a description is no longer necessary.

As shown in FIG. 4(a), a heated air block door 49 is disposed downstream of the heater core 9 for blocking the passage of heated air departed from the heater core 9 as occasion arises in the case where a water cock is not provided in an engine cooling water recirculation system.

The operation of the microcomputer 33 will be described below with reference to a flowchart shown in FIG. 5 in which a main control routine achieved in the microcomputer 33 for controlling the bi-level (BI-L) mode by $T_F$ values of discharge outlet changeover signal according to a first embodiment of the present invention.

The main control routine of the microcomputer starts in a step 50 in accordance with a program stored in the microcomputer 33. In the next step 52, various signals indicative of a representative temperature $T_R$ in the passenger compartment 15 detected by the representative temperature sensor 25, a head part temperature $T_{Rh}$ detected by the head part temperature sensor 26, a setting temperature $T_D$ set by the temperature setter 38, a solar radiation quantity $T_S$ detected by the solar radiation sensor 28, etc. are digitalized, then inputted in the microcomputer 33. Thereafter, the control goes on to a step 54 in which a total signal $T_1$ for main temperature conditioning is calculated based on the representative temperature $T_R$, the outside air temperature $T_A$, the solar radiation quantity $T_S$ and a temperature $T_E$ of the downstream side of the evaporator 8. The calculation is achieved in accordance with the following equation (1).

$$T = K_R \cdot T_R + K_A \cdot T_A + K_S \cdot T_S + K_E \cdot T_E - K_D \cdot T_D + C \tag{1}$$

where $K_R$, $K_A$, $K_S$, $K_E$ and $K_D$ are gain constants and C is a calculation constant.

In the next following step 56, a value $T_F$ for a discharge outlet changeover signal in accordance with the following equation (2).

$$T_F = T_E + K_F \theta \tag{2}$$

where $K_F$ is a proportional constant and 8 is an opening of the air-mix door 10.

In the succeeding control steps 58 through 64, the bi-level (BI-L) mode is changed over into one of plural stages according to the $T_F$ value. More particularly, in the step 58, it is judged whether the discharge outlet change-over signal value $T_F$ is larger than $T_{F1}$. If yes, then the control goes on in the direction of (A) to a step 74. Conversely, if $T_F$ is smaller than $T_{F2}$, then the control proceeds in the direction of (B) to a step 60. In this instance, $T_{F1} > T_{F2}$ and there is provided a hysteresis between $T_{F1}$ and $T_{F2}$. In the step 74, the discharge outlet is set to the heat outlet (HEAT) 14 and then the control proceeds to a step 82. On the other hand, in the step 60, $T_F$ value is compared with $T_{F3}$ and $T_{F4}$ where $T_{F3} > T_{F4}$, and if $T_F$ is larger than $T_{F3}$, then the control goes on in a direction of (A) to a step 66. Conversely, if $T_F < T_{F4}$, then the control proceeds in the direction of (B) to a step 62. In the step 66, the discharge outlet is set to a third bi-level (BI-L3) stage and then the control proceeds to a step 76. In the BI-L3 stage mode, the ratio of the amount of air discharged from the vent outlet (VENT) 13 is set to 2:8. On the other hand, in the step 62 it is judged whether $T_F$ value is larger than $T_{F5}$, and if yes, then the control goes on in the direction of (A) to a step 68. Conversely, if $T_F$ is smaller than $T_{F6}$ ($T_{F5} > T_{F6}$), then the control proceeds in the direction of (B) to a step 64. In the step 68, the discharge outlet is set to a second bi-level (BI-L2) in which air is discharged from the vent outlet (VENT) 13 and the heat outlet (HEAT) 14 in the ratio 5:5. On the other hand in the step 64, a further judgment is made to determine as to whether $T_F$ value is greater than $T_{F7}$. If $T_F > T_{F7}$, then the control proceeds in the direction of (A) to a step 70. Conversely, if $T_F$ is smaller than $T_{F8}$ ($T_{F7} > T_{F8}$), then the control goes on in the direction (B) to a step 72. In the step 70, the discharge outlet is set to a first bi-level (BI-Ll) stage and then the control proceeds to a step 80. In the BI-LI stage mode, air is discharged from the vent outlet (VENT) 13 and the heat outlet (HEAT) 14 in the ratio 8:2. In the step 72, the vent outlet (VENT) 13 is selected as the discharge outlet and then the control goes on to a step 84.

In the step 76, a program variable A is set to a prescribed value a and the control proceeds to the step 84. The program variable A is used as a calculation constant A when a head part total signal $T_2$ is calculated in a manner described later on. Likewise, in the step 78, the variable A is set to a prescribed value b (a>b) and the control proceeds to the step 84. Similarly, in the step 80, the variable A is set to a prescribed value c (b>c), then the control goes on to the step 84. On the other hand in the step 82, the temperature $T_E$ on the downstream side of the evaporator is compared with predetermined values $T_{E1}$ and $T_{E2}$ ($T_{E1} > T_{E2}$). If $TE > T_{E1}$, then the control proceeds in the direction of (A) to the step 84. Conversely, if $T_E < T_{E2}$, then the control goes on in the direction (B) to a step 88.

In the step 84, the head part total signal $T_2$ is calculated based on the head part temperature $T_{Rh}$, the solar radiation quantity $t_S$ and the head part setting temperature $T_{Dh}$. This calculation is achieved in accordance with the following equation (3).

$$T_2 = \alpha \cdot T_{Rh} + \beta \cdot T_S - \Gamma \cdot T_{Dh} + A \quad (3)$$

where $\alpha$, $\beta$ and $\Gamma$ are gain constants.

The head part temperature calculation step 84 is followed by a step 86 in which the bypass door 21 is controlled. This control step 86 is provided in view of such an experimentally proved fact that due mainly to the structure of the air-conditioner unit and even when the opening of the air-mix door 10 is kept constant, the representative passenger compartment temperature $T_R$ tends to drop greater in the third bi-level stage (BI-L3) mode than in the second bi-level stage (BI-L2) mode which in turn is greater in temperature drop than the first bi-level stage (BI-Ll) mode. According to the conventional control practice, the opening of the bypass door 21 is gradually reduced with an increase in the total signal $T_2$ value. On the contrary, according to the control step 86 of the present invention, owing to the respective operations in the steps 76, 78, 80, the opening of the bypass door 21 is controlled in such a manner as to become smaller as the discharge mode is shifted in a direction from the first bi-level stage (BI-L1) mode to the third bi-level stage (BI-L3) mode. With this control of the bypass door 21, the amount of cooled air discharged from the vent outlet 13 is reduced so that an undue drop of the representative passenger compartment temperature $T_R$ can be avoided.

In the step 88, the air-mix door 10 is controlled based on the total signal $T_1$. This control practice is achieved in accordance with a performance characteristic pattern of the opening of the air-mix door which is unconditionally determined with respect to the magnitude of the total signal $T_1$. Such a control practice is conventional and hence no description is necessary.

Then the control proceeds to a step 90 for controlling the operation of the blower 7 according to a performance characteristic pattern of the rotational speed of the blower 7 which is predetermined with respect to $T_1$. Thereafter, the control proceeds to a step 92 in which the control routine comes to an end.

In the embodiment described above, the selection of the discharge outlets including the three stages of bi-level mode is achieved based on the discharge outlet changeover signal value $T_F$. Alternatively, such a changeover of the discharge outlets may be made according to the magnitude of the total signal $T_1$.

Figure 7:
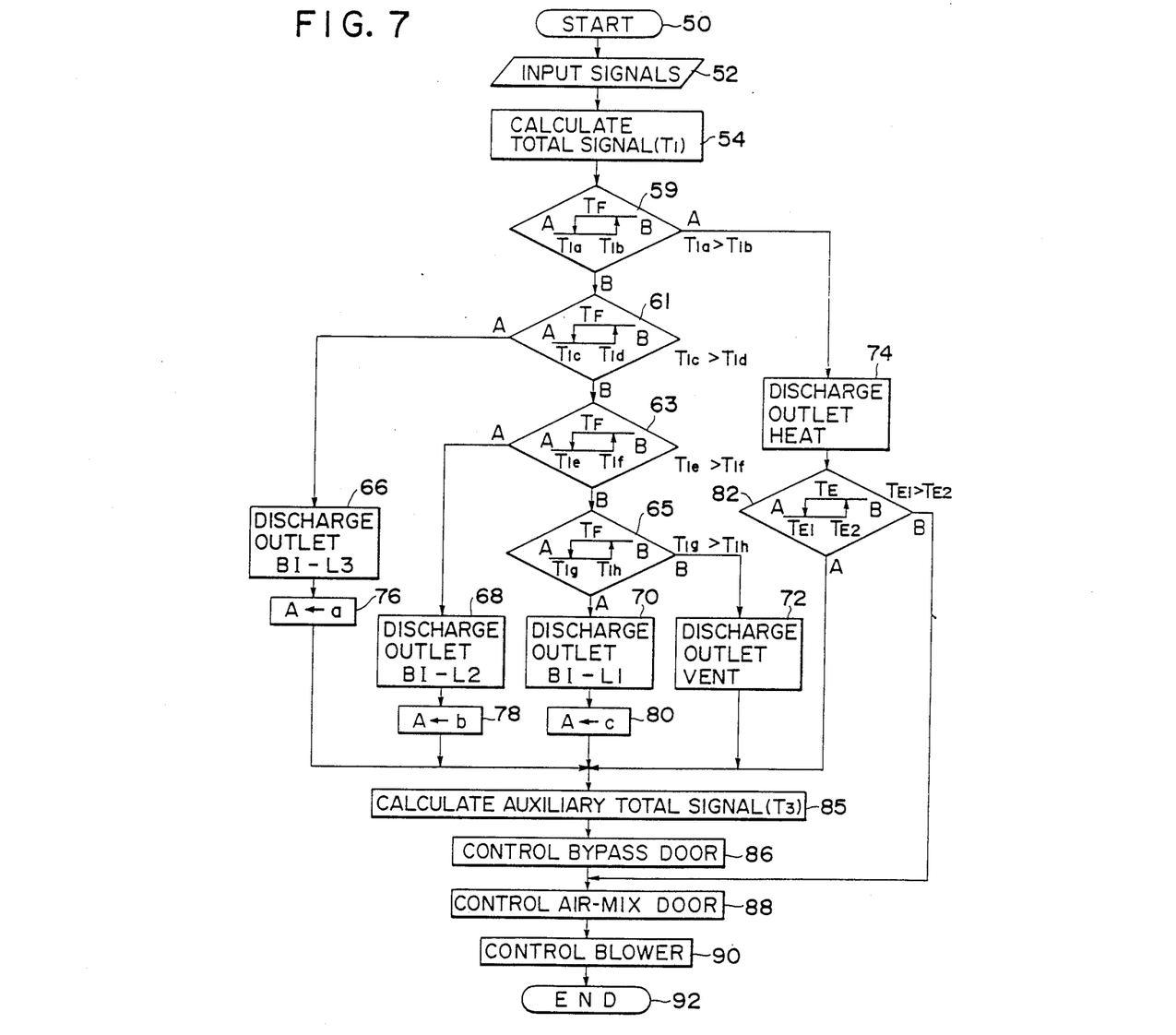
FIG. 7 is a flowchart showing a control routine achieved by a microcomputer of the automobile air-conditioner according to a second embodiment shown in FIG. 2.

The second embodiment of the present invention is similar to the first embodiment described above but differs therefrom in that the head part total signal $T_2$ is replaced by an auxiliary total signal $T_3$ and in that the judgment for discharge outlet changeover operation is made based on the magnitude of the total signal $T_1$ instead of $T_F$ value.

FIG. 7 is a flowchart showing a main control routine achieved in the microcomputer 33. In the flowchart, these steps which are the same as those described above with respect to the first embodiment shown in the flowchart of FIG. 5 are designated by the same reference numerals, and a description given below is limited to the those steps which are different to the steps of the first embodiment.

Figure 5:
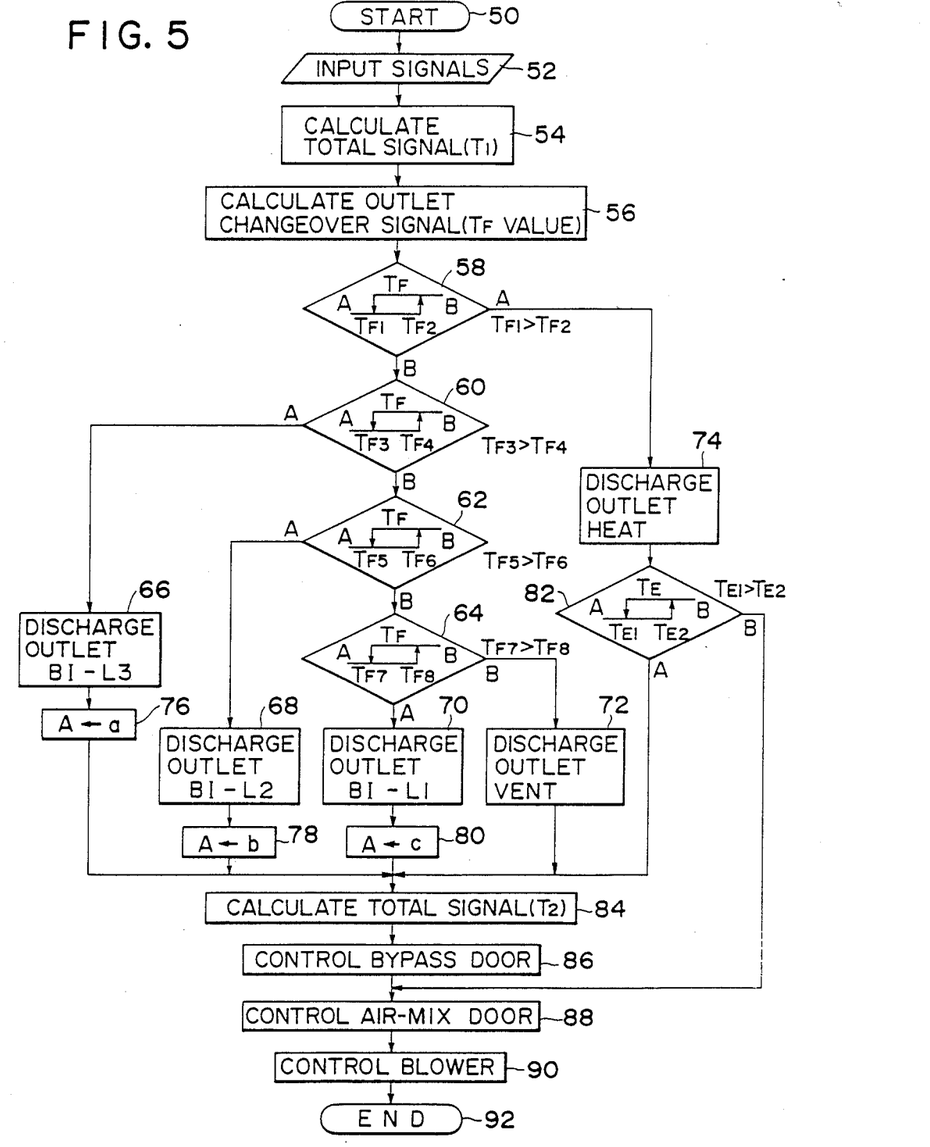
FIG. 5 is a flowchart showing a control routine achieved by a microcomputer of the automobile air-conditioner according to a first embodiment shown in FIG. 1.
Figure 6:
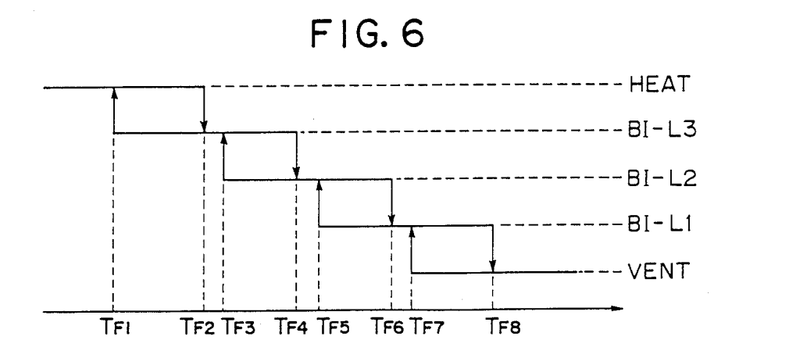
FIG. 6 is a graph illustrative of the relation between changeover values for multistage bi-level (BI-L) mode and discharge outlet changeover signals ($T_F$)

According to the second embodiment, the step 56 of $T_F$ value calculation shown in FIG. 5 is not necessary and the steps 58, 60, 62 and 64 shown in FIG. 5 are replaced by steps 59, 61, 63 and 65, respectively, as shown in FIG. 7. In these steps 59, 61, 63, 65, at least one of the discharge outlets is selected depending on the value of the total signal $T_1$ calculated in the preceding step 54. In this instance, various criteria $T_{1a}$–$T_{1h}$ are used for the selection of the discharge outlet. These criteria $T_{1a}$–$T_{1h}$ are different to the criteria $T_{F1}$–$T_{F8}$ shown in FIG. 5 but the selection is achieved basically in the same manner as done in the first embodiment shown in FIG. 5.

In the step 85, the auxiliary total signal $T_3$ is calculated. This calculation is achieved in accordance with the following equation (4).

$$T_3 = D \cdot T_R + E \cdot T_D + F \cdot T + A \qquad (4)$$

where D, E and F are gain constants and A is a program variable.

According to the second embodiment of the invention, the bypass door 21 is controlled solely by using the total signal $T_1$ without using the auxiliary total signal $T_3$. In this instance, the calculation constant C used for the calculation of the total signal $T_1$ is dealt as a program variable and the program variable C is set to a proper value depending on selected one of the multistage bi-level (BI-L) mode.

Obviously, various modifications and variations of the present invention are possible in the light of the above teaching. It is therefore to be understood that within the scope of the appended claims the present invention may be practiced otherwise than as specifically described.

What is claimed is:

1. An air-conditioner for an automobile, comprising:
   (a) cooled air bypass means for introducing air into a passenger compartment of the automobile immediately after its passage around an evaporator, said cooled air bypass means being capable of adjusting the amount of air passing therethrough;
   (b) total signal calculation means for calculating a total signal corresponding to a thermal load in the passenger compartment based on at least a vehicle passenger compartment temperature, a setting temperature and an outside air temperature;
   (c) discharge mode setting means for setting a discharge mode by actuating a plurality of mode doors of a plurality of discharge outlets based on at least a temperature at the downstream side of said evaporator and an opening of an air-mix door controlled according to the result of calculation by said total signal calculation means;
   (d) head part total signal calculation means for calculating a head part total signal corresponding to a thermal load in the vicinity of the head of an occupant based on at least the difference between a temperature in the vicinity of the head of the occupant and a head part setting temperature equivalent to a preset value for air-conditioning temperature in the vicinity of the head of the occupant, and the result of setting by said discharge mode setting means; and
   (e) cooled air bypass control means for controlling the operation of said cooled air bypass means according to the result of calculation by said head part total signal calculation means so as to vary the amount of air passing through said cooled air bypass means.

2. An air-conditioner according to claim 1, wherein said discharge mode includes a plurality of bi-level modes having different ratios of the amount of air discharged from a vent outlet to the amount of air discharged from a heat outlet.

3. An air-conditioner according to claim 1, wherein said head part total signal calculation means is operable to vary a calculation constant according to the result of setting by said discharge mode setting means.

4. An air-conditioner for an automobile, comprising:
   (a) cooled air bypass means for introducing air into a passenger compartment of the automobile immediately after its passage around an evaporator, said cooled air bypass means being capable of adjusting the amount of air passing therethrough;
   (b) total signal calculation means for calculating a total signal corresponding to a thermal load in the passenger compartment based on at least a vehicle passenger compartment temperature, a setting temperature and an outside air temperature;
   (c) discharge mode setting means for setting a discharge mode by actuating a plurality of mode doors of a plurality of discharge outlets based on at least a temperature at the downstream side of said evaporator and an opening of an air-mix door controlled according to the result of calculation by said total signal calculation means;
   (d) auxiliary total signal calculation means for calculating an auxiliary total signal corresponding to said thermal load in the passenger compartment based on at least said vehicle passenger compartment temperature, said setting temperature, the quantity of solar radiation, and the result of setting by said discharge mode setting means; and
   (e) cooled air bypass control means for controlling the operation of said cooled air bypass means according to the result of calculation by said auxiliary total signal calculation means so as to vary the amount of air passing through said cooled air bypass means.

5. An air-conditioner according to claim 4, wherein said discharge mode includes a plurality of bi-level modes having different ratios of the amount of air discharged from a vent outlet to the amount of air discharged from a heat outlet.

6. An air-conditioner according to claim 4, wherein said head part total signal calculation means is operable to vary a calculation constant according to the result of setting by said discharge mode setting means.

* * * * *